(12) United States Patent
Yang

(10) Patent No.: US 7,852,580 B2
(45) Date of Patent: Dec. 14, 2010

(54) ACTUATION DEVICE HAVING SHAPE MEMORY ALLOY COMPONENT

(75) Inventor: Kevin Yang, Taipei Hsien (TW)

(73) Assignee: Chicony Electronics Co. Ltd. (TW)

( * ) Notice: Subject to any disclaimer, the term of this patent is extended or adjusted under 35 U.S.C. 154(b) by 249 days.

(21) Appl. No.: 12/078,592

(22) Filed: Apr. 2, 2008

(65) Prior Publication Data

US 2009/0167108 A1   Jul. 2, 2009

(30) Foreign Application Priority Data

Dec. 31, 2007   (TW) ............................... 96151337 A

(51) Int. Cl.
G02B 7/02 (2006.01)
(52) U.S. Cl. .................. 359/824; 359/822; 359/823
(58) Field of Classification Search ................ 359/811, 359/819, 822–824
See application file for complete search history.

(56) References Cited

U.S. PATENT DOCUMENTS

2004/0263299 A1* 12/2004 Noji ........................... 335/229
2009/0009893 A1* 1/2009 Wang ........................ 359/824

* cited by examiner

Primary Examiner—Jessica T Stultz
Assistant Examiner—Mahidere S Sahle
(74) Attorney, Agent, or Firm—Bacon & Thomas, PLLC

(57) ABSTRACT

An actuation device having a shape memory alloy component containing: a base having a bottom portion, at least one first magnetic component disposed under the bottom portion of base, a carrier having a top portion, at least one second magnetic component which is disposed on the top portion of carrier and which corresponds in location to the first magnetic component, and a shape memory alloy component which is disposed between the base and the carrier. Shape memory alloy component has at least one deformable supporting component, which is disposed at a position corresponding to both positions of the first magnetic component and of the second magnetic component, for supporting the carrier. The supporting component is in a horizontal form between the base and the carrier since there is a magnetic force between the first magnetic component and the second magnetic component.

22 Claims, 3 Drawing Sheets

ACTUATION DEVICE HAVING SHAPE MEMORY ALLOY COMPONENT

BACKGROUND OF THE INVENTION

1. Field of the Invention

The present invention relates to an actuation device, and more particularly, to an actuation device that uses the driving force resulting from a phase transformation in shape memory alloys.

2. Description of the Related Art

As consumer technology industry keeps its vigorous growth in modern days, all kinds of electronic products making things better and easier for consumers never stop emerging out of the market. On the list of some most widely-used electronic products in recent years, digital cameras and camera cell phones may never be missed.

A prior-art lens module for a digital camera or camera cell phone typically includes a housing, an optical lens and an image sensor. The optical lens for capturing images is coupled to the front side of the housing, wherein the optical lens is generally adjusted through certain mechanism, either of manual or automatic control, so that desired focal lengths can be obtained accordingly.

Said prior-art lens module for digital cameras or camera cell phones are required to be lightweight, thin and small, while at the same time, it needs to be exquisite and durable. Therefore, in a digital camera or camera cell phone, uses of lens modules for focal-length adjustment, which is controlled manually or driven by an electric motor (i.e., linear or non-linear movements), may be restricted due to space or weight limitations. This could further limit zoom ratios or other functions of the optical lens.

Typically, a prior-art lens module is provided with a flat spring that works by balancing with electromagnetism. Nonetheless, flat springs are likely to be deformed by external forces. For example, forces resulting from shocks, resets or continual uses of optical lenses may influence the stability and precision in lens movements. Therefore, there are drawbacks to prior-art lens modules that need to be improved.

SUMMARY OF THE INVENTION

The primary object of the present invention is to provide an actuation device having a shape memory alloy component. A carrier, a shape memory alloy component and a base are stacked in order, by a magnetic force between a first magnetic component and second magnetic component. Electric currents are conducted to said shape memory alloy component such that it is heated and then undergoes a martensitic phase transformation. Since the driving force resulting from phase transformation in the shape memory alloy material is greater than the magnetic force between said first magnetic component and said second magnetic component, supporting components of said shape memory alloy component are deformed and lifted upwards (lifting angles increased). In consequence, said carrier is pushed upwards. When the shape memory alloy material is cooled, lifting angles for said supporting components reduce gradually and turn into a horizontal state, and said carrier descends consequently.

To achieve the above object, an actuation device having a shape memory alloy component is provided that comprises: a base having a bottom portion, at least one first magnetic component disposed under said bottom portion of base, a carrier having a top portion, at least one second magnetic component which is disposed on said top portion of carrier and which corresponds in location to said first magnetic component, and a shape memory alloy component which is disposed between said base and said carrier. Said shape memory alloy component has at least one deformable supporting component, which is disposed at a position corresponding to both positions of said first magnetic component and of said second magnetic component, for supporting said carrier. Said supporting component is in a horizontal form between said base and said carrier since there is a magnetic force between said first magnetic component and said second magnetic component. As the driving force resulting from a martensitic phase transformation in said shape memory alloy component becomes greater than the magnetic force between said first magnetic component and said second magnetic component, said supporting component is deformed and pushes said carrier upwardly. Thus, said carrier is actuated in an upward direction.

To achieve the above object, an actuation device having a shape memory alloy component is provided for use in a lens module, comprising: a base having a bottom portion, at least one first magnetic component disposed under said bottom portion of base, a carrier having a top portion, at least one second magnetic component which is disposed on said top portion of carrier and which corresponds in location to said first magnetic component, and a shape memory alloy component which is disposed between said base and said carrier. Said shape memory alloy component has at least one deformable supporting component, which is disposed at a position corresponding to both positions of said first magnetic component and of said second magnetic component, for supporting said carrier. Since there is a magnetic force between said first magnetic component and said second magnetic component, said supporting component remains a horizontal form between said base and said carrier, enabling a distant focus to be obtained. As the driving force resulting from a martensitic phase transformation in said shape memory alloy component becomes greater than the magnetic force between said first magnetic component and said second magnetic component, said supporting component is deformed and pushes said carrier upwardly. Thus, said carrier is actuated in an upward direction, enabling a near focus to be obtained.

Preferably, said actuation device further comprises a shield shielding over said carrier.

Preferably, said bottom portion of base is provided with at least one first recess for receiving said first magnetic component.

Preferably, said first magnetic component is a magnet.

Preferably, said first magnetic component is an iron sheet.

Preferably, said top portion of carrier is provided with at least one second recess for receiving said second magnetic component.

Preferably, said second magnetic component is a magnet.

Preferably, said second magnetic component is an iron sheet.

Preferably, said first magnetic component is a magnet, and said second magnetic component is an iron sheet.

Preferably, said first magnetic component is an iron sheet, and said second magnetic component is a magnet.

Preferably, said shape memory alloy component is provided with at least one conductive component, through which external electric currents can flow inwards to heat said shape memory alloy component, and thus, a phase transformation from martensite to austenite can occur in the shape memory alloy material.

DETAILED DESCRIPTION OF THE PREFERRED EMBODIMENT

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

Figure 1:
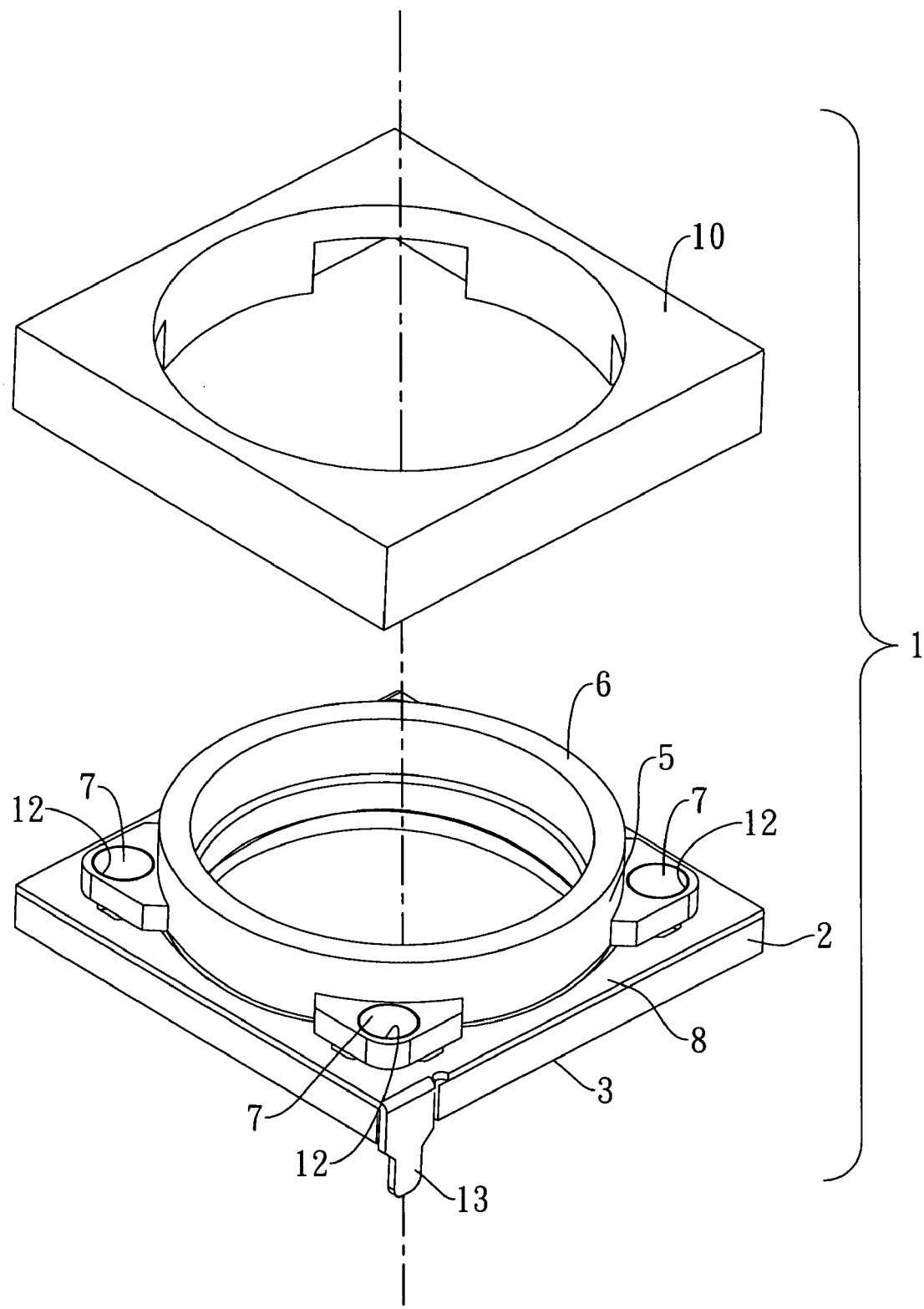
FIG. 1 shows a perspective view of an actuation device having a shape memory alloy component according to the present invention.
Figure 2:
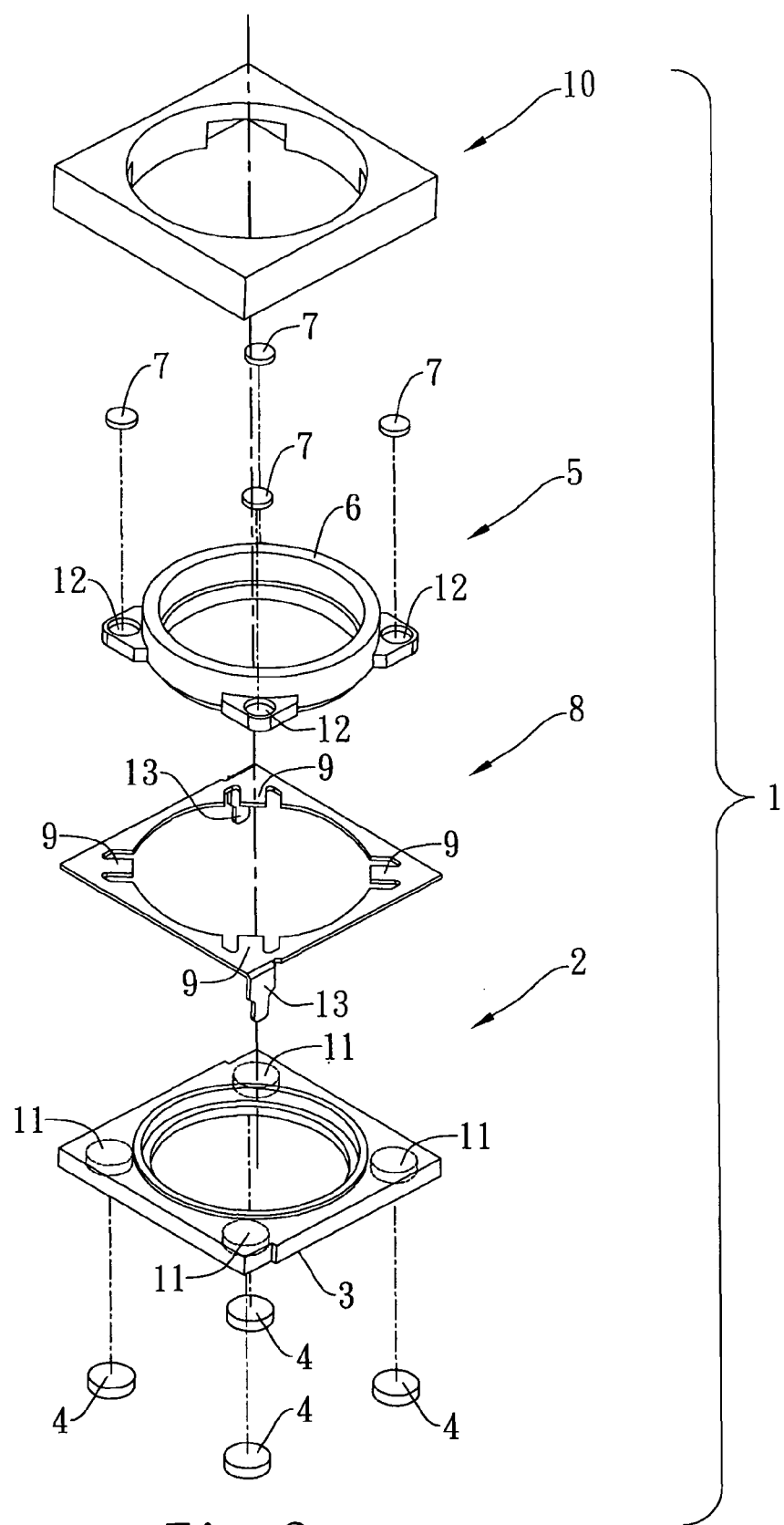
FIG. 2 shows an exploded view of the actuation device having a shape memory alloy component according to the present invention.

Referring to FIGS. 1 and 2, an actuation device 1 having a shape memory alloy component according to the present invention is shown in a perspective view and in an exploded view respectively. In this embodiment, said actuation device 1 of the present invention is for use in a lens module. Said actuation device 1 having a shape memory alloy component comprises: a base 2 having a bottom portion 3, a plurality of first magnetic components 4 disposed under said bottom portion 3 of base 2, a carrier 5 having a top portion 6 for carrying a lens, a plurality of second magnetic components 7 disposed on said top portion 6 of carrier 5, with each of said second magnetic components 7 corresponding in location to each of said first magnetic components 4, and a shape memory alloy component 8 disposed between said base 2 and said carrier 5, with said shape memory alloy component 8 having a plurality of deformable supporting components 9 disposed at positions corresponding to those of said first magnetic components 4 and said second magnetic components 7 to support said carrier 5.

Said actuation device 1 of the present invention further comprises a shield 10 shielding over said carrier 5. When said base 2, said shape memory alloy component 8, said carrier 5 and said shield 10 are assembled together, a cavity 14 is formed at the center of said actuation device 1. At each of the four corners of said bottom portion 3 of base 2, a first recess 11 is provided for receiving said first magnetic component 4, which may be a magnet or iron sheet. At each of the four corners of said top portion 6 of carrier 5, a second recess 12 is provided for receiving said second magnetic component 7. Said second recesses 12 correspond in location to said first recesses 11. Said second magnetic component 7, which may be a magnet or iron sheet, is received in said second recess 12 of carrier 5. Said first magnetic component 4 and said second magnetic component 7 shall be attracted to each other by a magnetic force. Therefore, when said first magnetic component 4 is a magnet, said second magnetic component 7 is an iron sheet; when said first magnetic component 4 is an iron sheet, said second magnetic component 7 is a magnet. Otherwise, said first magnetic component 4 and said second magnetic component 7 are magnets both. A conductive component 13 is provided at each of two opposite corners of said shape memory alloy component 8 to which external electric currents can be conducted.

Figure 3:
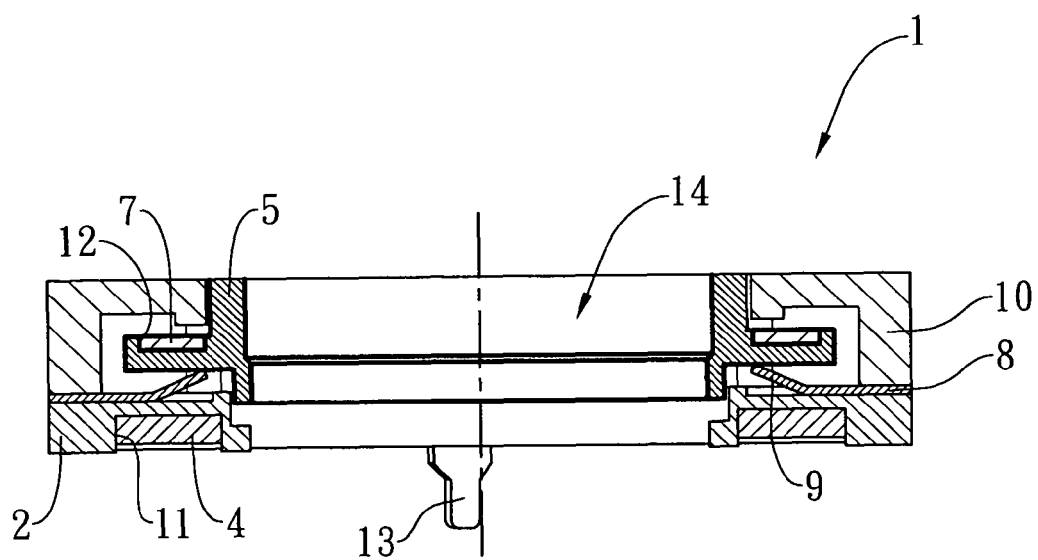
FIG. 3 shows a sectional view of the actuation device having a shape memory alloy component according to the present invention wherein the supporting components are deformed and lifted upwards.

Referring to FIG. 3, a sectional view of the actuation device 1 is shown with said supporting components 9 being deformed and lifted upwards. When an external electric current flows into said shape memory alloy component 8 through said conductive components 13, said shape memory alloy component 8 is heated and undergoes a phase transformation from martensite to austenite due to the increase in temperature. During the martensitic transformation, said supporting components 9 are deformed, generating a driving force at the same time. Since the driving force resulting from deformation of said supporting components 9 is greater than the magnetic force between said first magnetic component 4 and said second magnetic component 7, said supporting components 9 are lifted upwards. As a result, said carrier 5 is pushed and then actuated in an upward direction.

Figure 4:
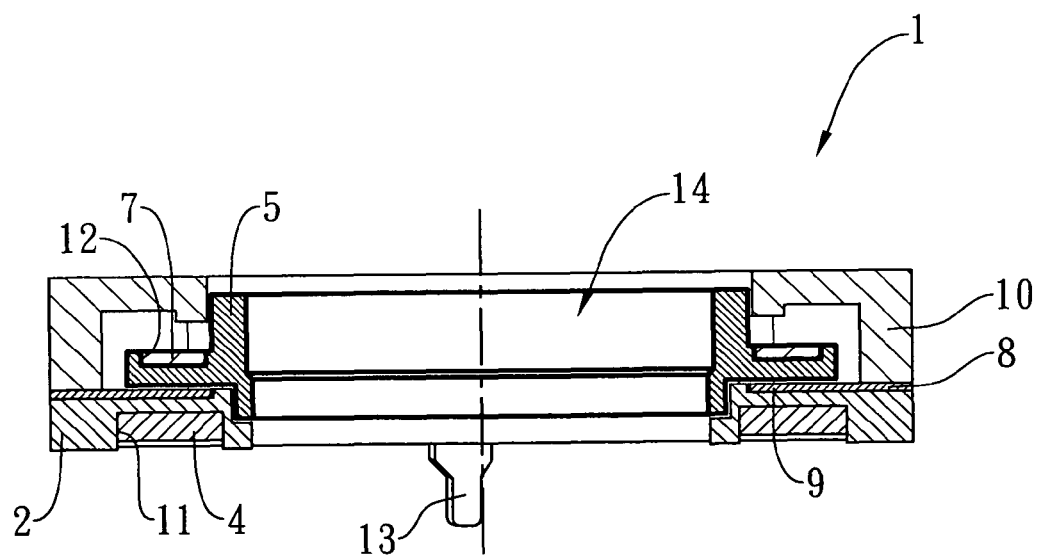
FIG. 4 shows a sectional view of the actuation device having a shape memory alloy component according to the present invention wherein the supporting components are deformed and descend.

Referring to FIG. 4, a sectional view of the actuation device 1 is shown, wherein said supporting components 9 are deformed and descend. When said shape memory alloy component 8 is cooled, said base 2 and said carrier 5 are driven back toward each other because of the magnetic force between said first magnetic component 4 and said second magnetic component 7. As a result, lifting angles for said supporting components 9 reduce gradually and turn into a horizontal state. Finally, said supporting components 9 return to the original flatness between said base 2 and said carrier 5, pressing said carrier 5 to descend.

When an actuation device 1 having a shape memory alloy component according to the present invention is applied to a lens module, actuation of said carrier 5 in an upward or downward direction will enable a lens of the lens module (not shown; the lens is received in said cavity 14 of actuation device 1) to zoom in or out. Accordingly, the focal length of the lens can be adjusted to have a near focus or distant focus.

The present invention is advantageous in that it uses the driving force resulting from martensitic phase transformations of shape memory alloys. Said supporting components of shape memory alloy component are deformed due to shape memory effect and produce a unidirectional driving force. As the driving force becomes greater than the magnetic force between said first magnetic component and said second magnetic component, the carrier is pushed and actuated in an upward direction.

While this invention has been described by way of examples and in terms of preferred embodiments, it is to be understood that this invention is not limited hereto, and that various changes and modifications can be made by those skilled in the art without departing from the spirit and scope of this invention. It is intended that the scope of the invention be defined by the claims appended hereto.

What is claimed is:

1. An, actuation device having a shape memory alloy component, comprising:
   a base having a bottom portion;
   at least one first magnetic component disposed under said bottom portion of base;
   a carrier having a top portion;
   at least one second magnetic component disposed on said top portion of carrier, said second magnetic component corresponding in location to said first magnetic component; and
   a shape memory alloy component disposed between said base and said carrier, said shape memory alloy component having at least one deformable supporting component disposed at a position corresponding to both positions of said first magnetic component and of said second magnetic component for supporting said carrier, and said supporting component being in a horizontal form between said base and said carrier since there is a magnetic force between said first magnetic component and said second magnetic component;

wherein as the driving force resulting from a martensitic phase transformation in said shape memory alloy component becomes greater than the magnetic force between said first magnetic component and said second magnetic component, said supporting component is deformed and pushes said carrier upwardly to actuate it in an upward direction.

2. The actuation device of claim 1, further comprising a shield shielding over said carrier.

3. The actuation device of claim 1, wherein said bottom portion of base is provided with at least one first recess for receiving said first magnetic component.

4. The actuation device of claim 3, wherein said first magnetic component is a magnet.

5. The actuation device of claim 3, wherein said first magnetic component is an iron sheet.

6. The actuation device of claim 1, wherein said top portion of carrier is provided with at least one second recess for receiving said second magnetic component.

7. The actuation device of claim 6, wherein said second magnetic component is a magnet.

8. The actuation device of claim 6, wherein said second magnetic component is an iron sheet.

9. The actuation device of claim 1, wherein said first magnetic component is a magnet and said second magnetic component is an iron sheet.

10. The actuation device of claim 1, wherein said first magnetic component is an iron sheet and said second magnetic component is a magnet.

11. The actuation device of claim 1, wherein said shape memory alloy component is provided with at least one conductive component, through which external electric currents can flow inwards to heat said shape memory alloy component so that a phase transformation from martensite to austenite can occur in the shape memory alloy material.

12. An actuation device having a shape memory alloy component, for use in a lens module, comprising:
a base having a bottom portion;
at least one first magnetic component disposed under said bottom portion of base;
a carrier having a top portion;
at least one second magnetic component disposed on said top portion of carrier, said second magnetic component corresponding in location to said first magnetic component; and
a shape memory alloy component disposed between said base and said carrier, said shape memory alloy component having at least one deformable supporting component disposed at a position corresponding to both positions of said first magnetic component and of said second magnetic component for supporting said carrier, and said supporting component being in a horizontal form, which enables a distant focus to be obtained, between said base and said carrier since there is a magnetic force between said first magnetic component and said second magnetic component;

wherein as the driving force resulting from a martensitic phase transformation in said shape memory alloy component becomes greater than the magnetic force between said first magnetic component and said second magnetic component, said supporting component is deformed and pushes said carrier upwardly to actuate it in an upward direction, which enables a near focus to be obtained.

13. The actuation device of claim 12, further comprising a shield shielding over said carrier.

14. The actuation device of claim 12, wherein said bottom portion of base is provided with at least one first recess for receiving said first magnetic component.

15. The actuation device of claim 14, wherein said first magnetic component is a magnet.

16. The actuation device of claim 14, wherein said first magnetic component is an iron sheet.

17. The actuation device of claim 12, wherein said top portion of carrier is provided with at least one second recess for receiving said second magnetic component.

18. The actuation device of claim 17, wherein said second magnetic component is a magnet.

19. The actuation device of claim 17, wherein said second magnetic component is an iron sheet.

20. The actuation device of claim 12, wherein said first magnetic component is a magnet and said second magnetic component is an iron sheet.

21. The actuation device of claim 12, wherein said first magnetic component is an iron sheet and said second magnetic component is a magnet.

22. The actuation device of claim 12, wherein said shape memory alloy component is provided with at least one conductive component, through which external electric currents can flow inwards to heat said shape memory alloy component so that a phase transformation from martensite to austenite can occur in the shape memory alloy material.

\* \* \* \* \*